Feb. 28, 1928.
R. W. JANDA
1,660,448
CLUTCH
Filed Aug. 30, 1926　　　2 Sheets-Sheet 2
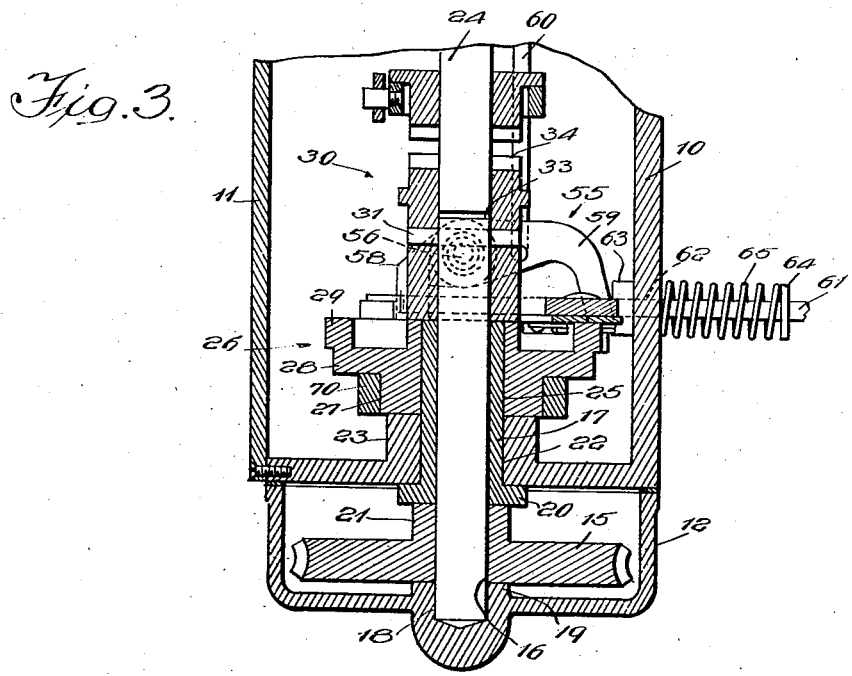
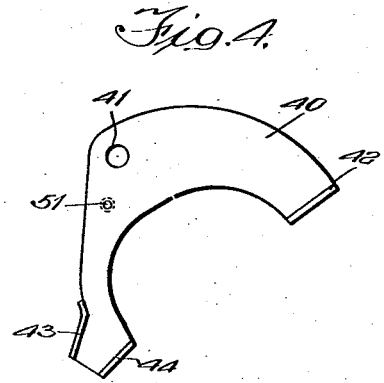
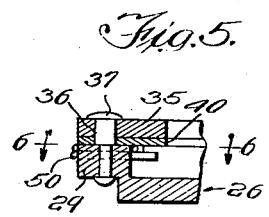
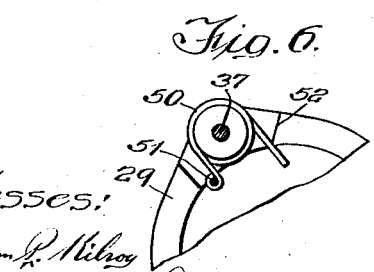
Inventor
Rudolph W. Janda
By Brown, Boettcher & Dienner
Attys.

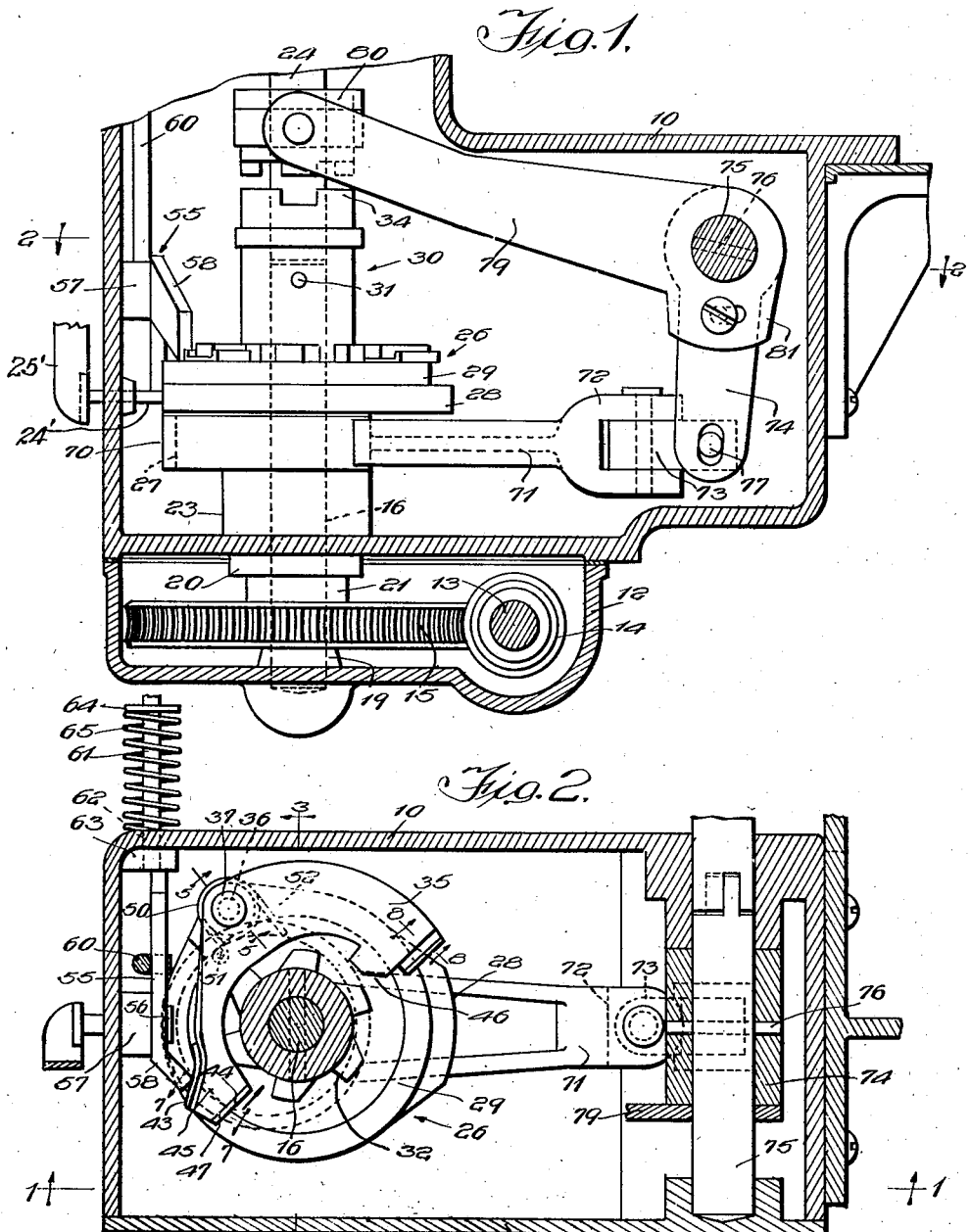

Patented Feb. 28, 1928.

1,660,448

UNITED STATES PATENT OFFICE.

RUDOLPH W. JANDA, OF CICERO, ILLINOIS, ASSIGNOR TO CONLON CORPORATION, OF CICERO, ILLINOIS, A CORPORATION OF ILLINOIS.

CLUTCH.

Application filed August 30, 1926. Serial No. 132,399.

The present invention pertains in general to clutch mechanism, and more particularly to a clutch especially adapted for use in ironing machines of the character disclosed in the patent application of Messrs. Anderson and Janda, Serial No. 115,820, filed June 14, 1926.

I propose to provide novel clutch mechanism wherein a clutch finger is mounted in a cradle, there being a limited degree of movement between the cradle and the finger for permitting the finger to be automatically moved entirely clear of a revolving toothed clutch part during the time the clutch is disengaged. This arrangement precludes the revolving toothed part from rubbing on the clutch finger when the clutch is disengaged thus increasing the longevity of the clutch parts.

Other objects and advantages of my invention will more fully appear from the following detail description taken in connection with the accompanying drawings which illustrate one embodiment thereof and in which, Figure 1 is a fragmentary view taken on the line 1—1 of Fig. 2, partly in section, of a clutch mechanism applied to the mechanism of an ironing machine, such as that disclosed in the aforesaid copending patent application;

Fig. 2 is a fragmentary plan view of the clutch mechanism shown in Fig. 1, partly in section, taken on substantially the line 2—2 of Fig. 1, looking downwardly;

Fig. 3 is a sectional view taken on line 3—3 of Fig. 2 looking in the direction indicated by the arrows;

Fig. 4 is a detail view of my novel cradle for the clutch finger;

Fig. 5 is a detail sectional view taken on the line 5—5 of Fig. 2 looking in the direction indicated by the arrows;

Fig. 6 is a view taken on the line 6—6 of Fig. 5 looking downwardly;

Fig. 7 is a sectional view taken on the line 7—7 of Fig. 2 looking in the direction indicated by the arrows; and Fig. 8 is a sectional view taken on the line 8—8 of Fig. 2 looking upwardly.

Referring now to the drawings in detail in which like reference numerals designate similar parts throughout the several views, 10 denotes generally a casing or housing for enclosing the operating mechanism of an ironing machine such as that disclosed in the aforesaid co-pending application. The housing 10 is provided with a removable cover plate 11, by means of which access may be had to the operating mechanism including my novel clutch. Detachably attached to the lower portion of the housing 10 is a removable gear casing 12 into which extends a motor driven shaft 13 which operates the ironing machine mechanism. Splined to this shaft 13 is a worm 14 which at all times meshes with a worm wheel 15 carried on the lower end of a vertical shaft 16.

The vertical shaft 16 extends upwardly into the housing 10 through a vertical sleeve 17. The lower end of the shaft 16 is journaled at 18 in the bottom of the gear housing 12. The bottom of the housing 12 is equipped with a circular boss 19 which encircles the lower end of the shaft 16 and the concentric sleeve 17 is furnished with an enlarged end portion 20 at its lower end. The worm wheel 15 has a hub 21 which encircles that portion of the vertical shaft 16 between the enlarged portion 20 and the boss 19 in the housing 12. (Fig. 3).

The sleeve 17, as previously mentioned, is telescoped by the vertical shaft 16 and extends upwardly through an opening 22 in the bottom of the casing 10. Also, it should be noted that the bottom of the casing 10 is furnished with a boss 23 which serves as a bearing for the sleeve 17. Positioned within the casing 10 in axial alignment with the shaft 16 is a shaft 24 which is adapted to be clutched to the shaft 16 to drive the ironing roll (not shown) of the ironing machine as disclosed in the aforesaid co-pending application.

The sleeve 17 extends upwardly through an opening 25 in a member designated generally by the reference character 26. The member 26 includes an eccentric portion 27, a cam portion 28 and a top portion 29. The cam portion 28 is adapted to engage a rod 24′ cooperable with a switch control member 25′ which is fully described in the aforementioned co-pending application. The member 26 is not secured or connected to the shaft 16 which extends therethrough but is loosely mounted upon the sleeve 17. Surrounding the shaft 16 above the member 26 is a clutch element 30 which is secured to the shaft by means of a pin 31. The lower end of the clutch element 30 is equipped with a plurality of clutch teeth 32 (Fig. 2). The shaft 16 extends only part way into the bore 33 of the clutch element 30, whereas the lower end of the shaft 24 extends into the remaining portion of the bore 33 (Fig. 3). The lower end of the shaft 24, however, is not secured to the element 30, as is obvious from Fig. 3. The upper end of the element 30 is equipped with a plurality of clutch teeth 34, the purpose of which will be described hereinafter.

The member 26 is positioned immediately over and on top of the boss 23 and the clutch element 30 is located on top of the member 26. I shall now proceed to describe in detail my novel clutch mechanism for operatively connecting the element 30 with the member 26.

Disposed on the top portion 29 of the member 26 is a clutch finger 35 having an aperture 36 (Fig. 2) surrounding a pin or rivet 37 secured to the top portion 29. The clutch finger 35 is positioned on a cradle 40 (Fig. 4) having an aperture 41 through which the rivet 37 extends. The cradle or nest 40 is provided with an upwardly projecting extension 42 adapted to engage an end of the finger 35. The cradle 40 like the finger 35 is somewhat crescent in shape, as best shown in Figs. 2 and 4. The cradle 40 also has a pair of upward projections or extensions 43 and 44 which diverge to a certain extent. The finger 35 includes a tapered lateral extension 45 adapted to fit loosely between the two projections 43 and 44 of the cradle 40. This lateral projection 45 has a limited degree of movement in the cradle as defined by the two projections 43 and 44, as best shown in Fig. 2.

Also the clutch finger 35 has an inwardly extending tooth 46 adapted to cooperate with the teeth 32 of the clutch member 30. Normally, when the clutch is in a disengaged position, the teeth 32 will contact the tooth 46 moving it out of their path into the position shown in Fig. 2. The amount of movement of the finger 35 about its pivot is determined by the amount of play the projection 45 has within the two parts 43 and 44 of the cradle. Obviously, when the tooth 46 is contacted by the teeth 32, the shoulder 47 (Fig. 2) of the projection 45 of the finger will contact the extension 44 of the cradle which will limit the movement of the finger.

Referring to Fig. 2, I have shown by an arrow the direction in which the finger projection 45 is moved when the teeth 32 engage the tooth 46. Encircling the pin or rivet 37 is a spring 50, one end of which is fastened to a stud 51 fastened to the under side of the cradle 40. The other end of this spring 50 which encircles the rivet 37 abuts a shoulder 52 formed in the top portion 29 of the member 26 (Fig. 6). This spring 50 serves to urge the finger and cradle in a direction opposite to that indicated by the arrow in Fig. 2. Obviously the cradle will carry the finger with it since the finger has only a limited degree of movement with respect to the cradle.

The clutch finger as illustrated in Fig. 2 is in a disengaged position and the spring 50 is rendered inoperative to urge the finger into an engagement with the clutch teeth 32 through the means of a trip lever designated generally by the reference character 55. The trip lever 55 is pivotally mounted upon a pin 56 secured at 57 to the side of the casing 10. One end of this trip lever 55 as designated by the reference character 58 is bent into a lateral extension which extension is adapted to engage the lateral extension 43 of the cradle 40, as is obvious in Fig. 2. This bent part 58 is also adapted to engage the lateral extension 42 of the cradle 40, as will be described hereinafter. The other end of the trip lever 55 is bent into a doglike portion 59 which extends downwardly, as best shown in Fig. 3.

Secured to the trip lever 55 between its ends is an end of a rod 60 which is preferably connected to a button disposed at the uppermost portion of the casing 10 as disclosed in the aforesaid copending patent application. This button rod is adapted to release the trip lever from engagement with the cradle upon its being depressed. In other words, by depressing the button manually the operating mechanism of the ironing machine may be set into motion as is fully disclosed in the aforesaid patent application.

Associated with the dog end 59 of the trip lever 55 is an end of a rod 61 which extends through an aperture 62 of the wall of the casing 10 and through a boss 63 formed integral with the wall of the casing. This end of the rod 61 is disposed in proximity to the trip lever 55 and is adapted to be moved into engagement with the dog end of the trip lever 55 to move this end of the lever downwardly and to thus move the lateral extension 58 out of cooperation with the cradle and finger to permit the spring 50 to become effective in urging the tooth 46 of the finger into cooperation with the teeth 32 of the clutch member. Secured to the rod 61 is a shoulder or washer 64 between which and the outer wall of the casing 10 is a compression spring 65 for normally urging the rod 61 in the direction away from the casing 10. This rod may be controlled manually by suitable leverage as disclosed in the aforesaid copending application.

Now from the foregoing, it will be evident that there is provided two mechanisms for moving the lateral extension 58 of the trip lever 55 out of cooperation with the cradle 40. When either of these mechanisms is operated, the spring 50 functions to urge the tooth 46 of the finger 35 into cooperation with the clutch teeth 32 of the clutch element 30. This will result in the member 26 being turned one-half of a revolution at which time the extension 42 of the other end of the cradle 40 will be engaged by the extension 58 of the trip lever 55. That is to say by the time the member 26 has made half a revolution, the trip lever 55 will be restored to its original position due to gravity; the end of the lever 55 associated with the extension 58 being made heavier than the dog end 59. Upon the portion or extension 42 of the cradle being engaged by the extension 58, the tooth 46 will be disengaged from the clutch teeth 32 thus disconnecting the member 26 from the element 30.

The eccentric portion 27 of the member 26 is surrounded by a strap portion 70 formed integral with one end of a lever arm 71. The other end of the lever 71 is forked as indicated at 72. Pivotally secured to this fork end 72 of the lever 71 is an element 73 which is pivotally connected to the free and lower end of an arm 74 (Fig. 1). The arm 74 is secured to a longitudinal shaft 75 by means of a pin 76. This shaft 75 is suitably journaled in the casing 10 and the cover plate 11 and is preferably composed of two sections. Also this shaft 75 is connected directly to the presser on the ironing mechanism as shown in the aforesaid copending patent application.

The lower end of the arm 74 is preferably bifurcated so as to enable it to receive the end of the element 73 which is pivotally attached thereto by means of a pin 77. The eccentric portion 27 is of such a construction that upon one-half a revolution of the member 26 the shaft 75 will be turned in one direction, and upon a second half a revolution of the member 26, the shaft will be returned to its former position.

Loosely mounted on the shaft 75, as is obvious from Figs. 1 and 2 is one end of an arm 79. This arm 79 is substantially flat and has its outer end associated with a movable clutch element 80 mounted on the shaft 24. The arm 79 has a downwardly extending portion 81 suitably connected to the arm 74. This arm upon the turning of the shaft 75 is adapted to move the clutch element 80 into engagement with the clutch teeth 34 of the clutch element 30 to clutch the two shafts 16 and 24 together for the purpose of driving the ironing machine roll as is fully described in the aforesaid pending patent application.

The operation of my present clutch mechanism is believed to be obvious from the foregoing detail description of the same. In brief, upon the disengaging of the trip lever 55 from the cradle 40, the spring 50 functions to urge both the cradle and the clutch finger in such a direction as to bring the tooth 46 into mesh with the teeth 32 of the clutch element 30 thus connecting the member 26 to the shaft 16. After the member 26 has made one-half of a revolution, the trip finger which by this time has been restored to its normal position comes into engagement with the cradle to move the clutch finger out of cooperation with the clutch teeth 32 thus stopping the rotation of the member 26. Also the clutch teeth 32 in rotating, when the clutch is disengaged, will automatically move the clutch tooth 46 out of their path. This is permitted due to the limited degree of play between the finger and the cradle, as previously described. This is a highly desirable feature because it eliminates rubbing between the clutch parts thus increasing their longevity.

I desire it understood that although I have described in detail the preferred embodiment of my invention, the invention is not to be limited thereby but only in so far as defined by the scope and spirit of the appended claims.

I claim:—

1. In combination, a driving clutch element, a member mounted adjacent said element, a clutch finger co-operable with said element and carried by the said member, and a cradle for the finger mounted on the member, the said finger having a limited degree of movement in said cradle and being movable by said driving clutch element clear of said clutch element when the clutch is disengaged.

2. In combination, a pair of cooperable clutch parts and a cradle for one of said parts, the part in said cradle comprising a curved clutch finger disposed substantially half-way around the other clutch part and having a limited degree of movement in said cradle to permit of it being moved clear of the other clutch part.

3. In combination, a pair of cooperable clutch parts, a cradle for one of said parts, resilient means connected to the cradle for urging it and the associated part towards the other clutch part, and means for normally maintaining the clutch part in the cradle out of engagement with the other clutch part, said cradle including two substantially diametrically opposed trip portions engageable by said latter means.

4. In combination, a pair of cooperable clutch parts, a cradle for one of said parts, the part in the said cradle having a limited degree of movement to permit of it being moved clear of the other clutch part when the clutch is disengaged, resilient means for at all times urging the part in the cradle towards the other clutch part, and means for normally maintaining the said cradle clutch part out of engagement with the other part and for rendering the said resilient means ineffective, said cradle extending substantially half-way around said other part and having its ends formed into trip portions engageable by said latter means.

5. In combination, a clutch member including clutch teeth, a clutch finger substantially crescent in shape including a clutch tooth cooperable with said clutch teeth, and a substantially flat cradle for carrying said clutch element being formed similar in shape to said element and for moving said finger into and out of cooperation with said teeth.

6. In combination, a shaft, a member mounted on said shaft, a clutch element pivotally connected to said member on one side of said shaft for clutching the member to the shaft, and a pivotally mounted cradle in which said element is disposed for controlling movement of said element.

7. In combination, a first clutch element, a second clutch element cooperable therewith, and a cradle for one of said elements adapted to move the associated element into and out of cooperation with the other element, said second clutch element being movable relative to said cradle by said first element when the elements are in a disengaged position.

8. In combination, a toothed clutch element, a second clutch element, cooperable therewith, a nest for one of said elements for controlling the movement of the associated element, said nest having lateral extensions for limiting the movement of the clutch element therein, and resilient means connected to the said nest for urging it and the element therein into engagement with the other element.

9. In combination, a first clutch element, a second clutch element cooperable therewith, and a cradle for one of the said elements adapted to move the associated element into and out of cooperation with the other element, said cradle comprising a flat portion on which the associated element is disposed and lateral extensions for limiting the movement of the said element relative to the cradle.

10. In a combination, a clutch member, a clutch finger cooperable therewith including a tooth portion and a lateral extension, a cradle for the said finger including a pocket portion for receiving the said lateral extension, said clutch member having clutch teeth cooperable with said tooth portion, resilient means for urging the cradle and the clutch finger in such a direction as to bring the tooth portion into cooperation with said clutch teeth and trip means for engaging the said pocket portion of the cradle adapted to normally maintain the tooth portion out of engagement with the clutch teeth.

In witness whereof, I hereunto subscribe my name this 23rd day of August 1926.

RUDOLPH W. JANDA.